United States Patent
Shah et al.

(10) Patent No.: US 12,277,928 B2
(45) Date of Patent: *Apr. 15, 2025

(54) AUTOMATIC HOTWORD THRESHOLD TUNING

(71) Applicant: Google LLC, Mountain View, CA (US)

(72) Inventors: Aishanee Shah, Sunnyvale, CA (US); Alexander H. Gruenstein, Mountain View, CA (US); Ian C. McGraw, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/181,895

(22) Filed: Mar. 10, 2023

(65) Prior Publication Data

US 2023/0206908 A1   Jun. 29, 2023

Related U.S. Application Data

(63) Continuation of application No. 16/898,278, filed on Jun. 10, 2020, now Pat. No. 11,610,578.

(51) Int. Cl.
    *G10L 15/065*   (2013.01)
    *G10L 15/22*    (2006.01)

(52) U.S. Cl.
    CPC .......... *G10L 15/065* (2013.01); *G10L 15/22* (2013.01); *G10L 2015/223* (2013.01)

(58) Field of Classification Search
    CPC . G10L 15/065; G10L 15/22; G10L 2015/223; G10L 15/30; G10L 2015/088; G10L 15/08
    See application file for complete search history.

(56) References Cited

U.S. PATENT DOCUMENTS

| | | |
|---|---|---|
| 9,818,407 B1 | 11/2017 | Secker-Walker et al. |
| 10,079,015 B1 | 9/2018 | Lockhart et al. |

(Continued)

FOREIGN PATENT DOCUMENTS

| | | |
|---|---|---|
| WO | 2020123200 | 6/2020 |
| WO | 2020123200 A2 | 6/2020 |

OTHER PUBLICATIONS

Wadhwa et al., Dynamic adjustment of hotword detection threshold, Feb. 13, 2019, Defensive Publications Series, pp. 1-7 (Year: 2019).*

(Continued)

*Primary Examiner* — Linda Wong
(74) *Attorney, Agent, or Firm* — Honigman LLP; Brett A. Krueger; Grant Griffith

(57) ABSTRACT

A method for automatic hotword threshold tuning includes receiving, from a user device executing a first stage hotword detector configured to detect a hotword in streaming audio, audio data characterizing the detected hotword. The method includes processing, using a second stage hotword detector, the audio data to determine whether the hotword is detected by the second stage hotword detector. When the hotword is not detected, the method includes identifying a false acceptance instance at the first stage hotword detector indicating that the first stage hotword detector incorrectly detected the hotword. The method includes determining whether a false acceptance rate satisfies a false acceptance rate threshold based on a number of false acceptance instances within a false acceptance time period. When the false acceptance rate satisfies the false acceptance rate threshold, the method includes adjusting the hotword detection threshold of the first stage hotword detector.

14 Claims, 8 Drawing Sheets

(56) References Cited

U.S. PATENT DOCUMENTS

| | | | |
|---|---|---|---|
| 10,872,599 B1* | 12/2020 | Wu | G10L 15/08 |
| 11,205,420 B1 | 12/2021 | Fu et al. | |
| 11,355,102 B1 | 6/2022 | Mishchenko et al. | |
| 2016/0077794 A1 | 3/2016 | Kim et al. | |
| 2018/0233150 A1 | 8/2018 | Gruenstein et al. | |
| 2020/0090646 A1 | 3/2020 | Smith et al. | |
| 2020/0184966 A1* | 6/2020 | Yavagal | G10L 15/30 |

OTHER PUBLICATIONS

International Search Report, Application No. PCT/US2021/022443, Jun. 4, 2021, 18 pages.

USPTO. Office Action relating to U.S. Appl. No. 16/898,278, dated Aug. 18, 2022.

* cited by examiner

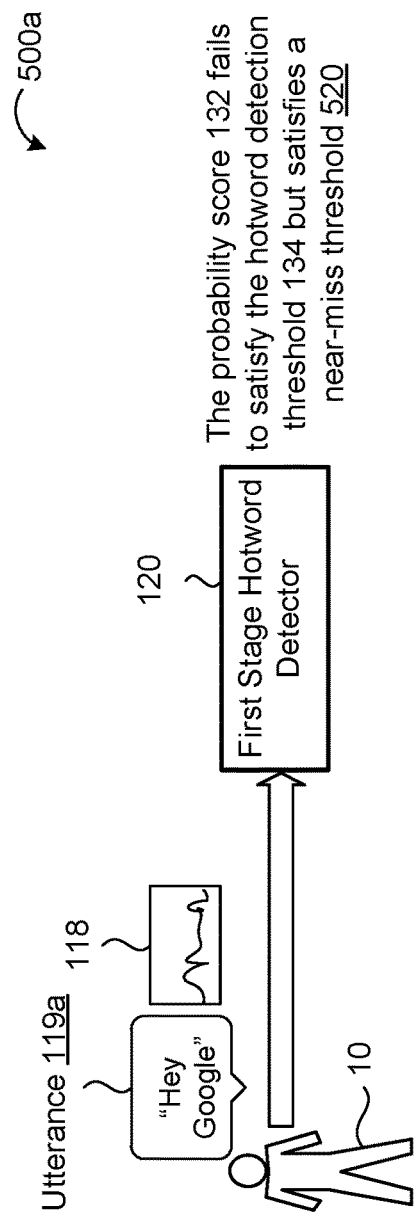
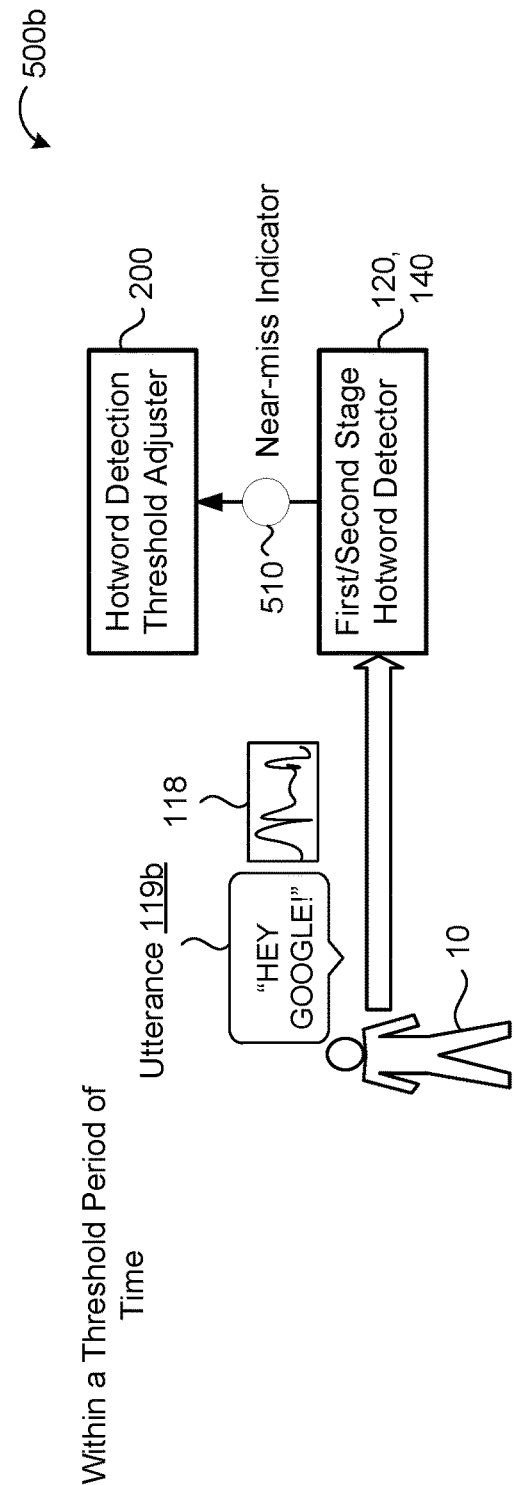
FIG. 5A
FIG. 5B

AUTOMATIC HOTWORD THRESHOLD TUNING

CROSS-REFERENCE TO RELATED APPLICATIONS

This U.S. patent application is a continuation of, and claims priority under 35 U.S.C. § 120 from, U.S. patent application Ser. No. 16/898,278, filed on Jun. 10, 2020. The disclosure of this prior application is considered part of the disclosure of this application and is hereby incorporated by reference in its entirety.

TECHNICAL FIELD

This disclosure relates to automatic hotword threshold tuning.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Typically, systems used to detect hotwords in streaming audio generate a probability score indicative of a probability that a hotword is present in the streaming audio. When the probability score satisfies a predetermined threshold, the device initiates the wake-up process.

SUMMARY

One aspect of the disclosure provides a method for automatic hotword threshold tuning. The method includes receiving, at data processing hardware, from a user device executing a first stage hotword detector, audio data characterizing a hotword detected by the first stage hotword detector in streaming audio captured by the user device. The first stage hotword detector is configured to generate a probability score indicating a presence of the hotword in audio features of the streaming audio captured by the user device and detect the hotword in the streaming audio when the probability score satisfies a hotword detection threshold of the first stage hotword detector.

The method also includes processing, by the data processing hardware, using a second stage hotword detector, the audio data to determine whether the hotword is detected by the second stage hotword detector in the audio data. When the hotword is not detected by the second stage hotword detector in the audio data, the method includes identifying, by the data processing hardware, a false acceptance instance at the first stage hotword detector indicating that the first stage hotword detector incorrectly detected the hotword in the streaming audio.

The method also includes determining, by the data processing hardware, whether a false acceptance rate associated with the first stage hotword detector of the user device satisfies a false acceptance rate threshold. The false acceptance rate is based on a number of false acceptance instances identified at the first stage hotword detector within a false acceptance time period. When the false acceptance rate associated with the first stage hotword detector satisfies the false acceptance rate threshold, the method includes adjusting, by the data processing hardware, the hotword detection threshold of the first stage hotword detector.

Implementations of the disclosure may include one or more of the following optional features. In some implementations, the method further includes, when the hotword is not detected by the second stage hotword detector in the audio data, suppressing, by the data processing hardware, a wake-up process on the user device for processing the hotword and/or one or more other terms following the hotword in the streaming audio. In some examples, the method further includes, when the hotword is detected by the second stage hotword detector in the audio data, determining, by the data processing hardware, whether subsequent audio data characterizing a spoken query following the hotword in the streaming audio is received from the user device. When no subsequent audio data characterizing the spoken query is received from the user device, the method may include identifying, by the data processing hardware, the false acceptance instance at the first stage hotword detector indicating that the first stage hotword detector incorrectly detected the hotword in the streaming audio.

Optionally, the method further includes, when subsequent audio characterizing the spoken query is received from the user device, processing, by the data processing hardware, the spoken query. The user device may be configured to initiate a wake-up process to process the hotword and/or one or more other terms following the hotword in the streaming audio when the first stage hotword detector detects the hotword in the streaming audio. Adjusting the hotword detection threshold of the first stage hotword detector, in some examples, includes increasing a value of the hotword detection threshold.

The method may further include, when receiving the audio data characterizing the hotword detected by the first stage hotword detector in the streaming audio, receiving, at the data processing hardware, from the user device, a near-miss indication indicating that the first stage hotword detector detected the hotword in the streaming audio within a threshold period of time after generating a previous probability score that failed to satisfy the hotword detection threshold by a threshold margin. The previous probability score indicates the presence of the hotword in previous audio features of the streaming audio captured by the user device.

When the hotword is detected by the second stage hotword detector in the audio data, the method may include identifying, by the data processing hardware, based on the near-miss indication, a false rejection instance at the first stage hotword detector indicating that the first stage hotword detector failed to initially detect the hotword in the previous audio features of the streaming audio and determining, by the data processing hardware, whether a false rejection rate associated with the first stage hotword detector of the user device satisfies a false rejection rate threshold. The false rejection rate is based on a number of false rejection instances identified at the first stage hotword detector within a false rejection time period. When the false rejection rate associated with the first stage hotword detector satisfies the false rejection rate threshold, the method may include adjusting, by the data processing hardware, the hotword detection threshold of the first stage hotword detector. In some examples, adjusting the hotword detection threshold includes decreasing the hotword detection threshold of the first stage hotword detector.

Another aspect of the disclosure provides another method for providing automatic hotword threshold tuning. The method includes receiving, at data processing hardware of a user device, streaming audio captured by one or more microphones in communication with the data processing hardware. The method also includes generating, by the data processing hardware, using a first stage hotword detector, a probability score indicating a presence of a hotword in audio features of the streaming audio. The method includes determining, by the data processing hardware, whether the probability score satisfies a hotword detection threshold.

When the probability score satisfies the hotword detection threshold, the method includes detecting, by the data processing hardware, the hotword in the streaming audio and transmitting, by the data processing hardware, to a remote computing device executing a second stage hotword detector, audio data characterizing the hotword detected in the streaming audio using the first stage hotword detector. The remote computing device configured to determine whether the hotword is detected by the second stage hotword detector in the audio data and, when the hotword is not detected by the second stage hotword detector in the audio data, identify a false acceptance instance at the first stage hotword detector indicating that the first stage hotword detector incorrectly detected the hotword in the streaming audio. When a false acceptance rate based on a number of false acceptance instances identified at the first stage hotword detector within a false acceptance time period satisfies a false acceptance rate threshold, the method includes adjusting, by the data processing hardware, the hotword detection threshold of the first stage hotword detector.

This aspect may include one or more of the following optional features. Adjusting the hotword detection threshold of the first stage hotword detector may include increasing a value of the hotword detection threshold. In some examples, when the probability score satisfies the hotword detection threshold, the method includes initiating, by the data processing hardware, a wake-up process on the user device for processing the hotword and/or one or more other terms following the hotword in the streaming audio. When the hotword is not detected by the second stage hotword detector in the audio data, the method may include suppressing, by the data processing hardware, the wake-up process on the user device.

In some examples, the method further includes, when the probability score satisfies the hotword detection threshold, determining, by the data processing hardware, a near-miss indication indicating that a previous probability score failing to satisfy the hotword detection threshold by a threshold margin was generated by the first stage hotword detector within a threshold period of time before detecting the hotword in the streaming audio. The method may also include transmitting, by the data processing hardware, to the remote computing device, the near-miss indication.

The remote computing device may be configured to identify, when the hotword is detected by the second stage hotword detector in the audio data, a false rejection instance at the first stage hotword detector based on the near-miss indication. The false rejection instance indicates that the first stage hotword detector failed to initially detect the hotword in previous audio features of the streaming audio. When a false rejection rate based on a number of false rejection instances identified at the first stage hotword detector within a false rejection time period satisfies a false rejection threshold, the method, in some implementations, includes adjusting, by the data processing hardware, the hotword detection threshold of the first stage hotword detector. Optionally, adjusting the hotword detection threshold includes decreasing a value of the hotword detection threshold.

Another aspect of the disclosure provides a system for providing automatic hotword threshold tuning. The system includes data processing hardware and memory hardware in communication with the data processing hardware. The memory hardware stores instructions that when executed on the data processing hardware cause the data processing hardware to perform operations. The operations include receiving, from a user device executing a first stage hotword detector, audio data characterizing a hotword detected by the first stage hotword detector in streaming audio captured by the user device. The first stage hotword detector is configured to generate a probability score indicating a presence of the hotword in audio features of the streaming audio captured by the user device and detect the hotword in the streaming audio when the probability score satisfies a hotword detection threshold of the first stage hotword detector.

The operations also include processing, using a second stage hotword detector, the audio data to determine whether the hotword is detected by the second stage hotword detector in the audio data. When the hotword is not detected by the second stage hotword detector in the audio data, the operations include identifying a false acceptance instance at the first stage hotword detector indicating that the first stage hotword detector incorrectly detected the hotword in the streaming audio.

The operations also include determining whether a false acceptance rate associated with the first stage hotword detector of the user device satisfies a false acceptance rate threshold. The false acceptance rate is based on a number of false acceptance instances identified at the first stage hotword detector within a false acceptance time period. When the false acceptance rate associated with the first stage hotword detector satisfies the false acceptance rate threshold, the operations include adjusting the hotword detection threshold of the first stage hotword detector.

Implementations of the disclosure may include one or more of the following optional features. In some implementations, the operations further include, when the hotword is not detected by the second stage hotword detector in the audio data, suppressing a wake-up process on the user device for processing the hotword and/or one or more other terms following the hotword in the streaming audio. In some examples, the operations further include, when the hotword is detected by the second stage hotword detector in the audio data, determining whether subsequent audio data characterizing a spoken query following the hotword in the streaming audio is received from the user device. When no subsequent audio data characterizing the spoken query is received from the user device, the operations may include identifying the false acceptance instance at the first stage hotword detector indicating that the first stage hotword detector incorrectly detected the hotword in the streaming audio.

Optionally, the operations further include, when subsequent audio characterizing the spoken query is received from the user device, processing the spoken query. The user device may be configured to initiate a wake-up process to process the hotword and/or one or more other terms following the hotword in the streaming audio when the first stage hotword detector detects the hotword in the streaming audio. Adjusting the hotword detection threshold of the first stage hotword detector, in some examples, includes increasing a value of the hotword detection threshold.

The operations may further include, when receiving the audio data characterizing the hotword detected by the first stage hotword detector in the streaming audio, receiving, from the user device, a near-miss indication indicating that the first stage hotword detector detected the hotword in the streaming audio within a threshold period of time after generating a previous probability score that failed to satisfy the hotword detection threshold by a threshold margin. The previous probability score indicates the presence of the hotword in previous audio features of the streaming audio captured by the user device.

When the hotword is detected by the second stage hotword detector in the audio data, the operations may include identifying, based on the near-miss indication, a false rejection instance at the first stage hotword detector indicating that the first stage hotword detector failed to initially detect the hotword in the previous audio features of the streaming audio and determining whether a false rejection rate associated with the first stage hotword detector of the user device satisfies a false rejection rate threshold. The false rejection rate is based on a number of false rejection instances identified at the first stage hotword detector within a false rejection time period. When the false rejection rate associated the first stage hotword detector satisfies the false rejection rate threshold, the operations may include adjusting the hotword detection threshold of the first stage hotword detector. In some examples, adjusting the hotword detection threshold includes decreasing the hotword detection threshold of the first stage hotword detector.

Another aspect of the disclosure provides another system for providing automatic hotword threshold tuning. The system includes data processing hardware of a user device and memory hardware in communication with the data processing hardware. The memory hardware stores instructions that when executed on the data processing hardware cause the data processing hardware to perform operations. The operations include receiving streaming audio captured by one or more microphones in communication with the data processing hardware. The operations also include generating, using a first stage hotword detector, a probability score indicating a presence of a hotword in audio features of the streaming audio. The operations include determining whether the probability score satisfies a hotword detection threshold.

When the probability score satisfies the hotword detection threshold, the operations include detecting the hotword in the streaming audio and transmitting, to a remote computing device executing a second stage hotword detector, audio data characterizing the hotword detected in the streaming audio using the first stage hotword detector. The remote computing device configured to determine whether the hotword is detected by the second stage hotword detector in the audio data and, when the hotword is not detected by the second stage hotword detector in the audio data, identify a false acceptance instance at the first stage hotword detector indicating that the first stage hotword detector incorrectly detected the hotword in the streaming audio.

When a false acceptance rate based on a number of false acceptance instances identified at the first stage hotword detector within a false acceptance time period satisfies a false acceptance rate threshold, the operations include adjusting the hotword detection threshold of the first stage hotword detector.

This aspect may include one or more of the following optional features. Adjusting the hotword detection threshold of the first stage hotword detector may include increasing a value of the hotword detection threshold. In some examples, when the probability score satisfies the hotword detection threshold, the operations include initiating a wake-up process on the user device for processing the hotword and/or one or more other terms following the hotword in the streaming audio. When the hotword is not detected by the second stage hotword detector in the audio data, the operations may include suppressing the wake-up process on the user device.

In some examples, the operations further include, when the probability score satisfies the hotword detection threshold, determining a near-miss indication indicating that a previous probability score failing to satisfy the hotword detection threshold by a threshold margin was generated by the first stage hotword detector within a threshold period of time before detecting the hotword in the streaming audio. The operations may also include transmitting, to the remote computing device, the near-miss indication.

The remote computing device may be configured to identify, when the hotword is detected by the second stage hotword detector in the audio data, a false rejection instance at the first stage hotword detector based on the near-miss indication. The false rejection instance indicates that the first stage hotword detector failed to initially detect the hotword in previous audio features of the streaming audio. When a false rejection rate based on a number of false rejection instances identified at the first stage hotword detector within a false rejection time period satisfies a false rejection threshold, the operations, in some implementations, include adjusting the hotword detection threshold of the first stage hotword detector. Optionally, adjusting the hotword detection threshold includes decreasing a value of the hotword detection threshold.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5A and 5B are schematic views of an example false rejection instance.

Like reference symbols in the various drawings indicate like elements.

DETAILED DESCRIPTION

Figure 1:
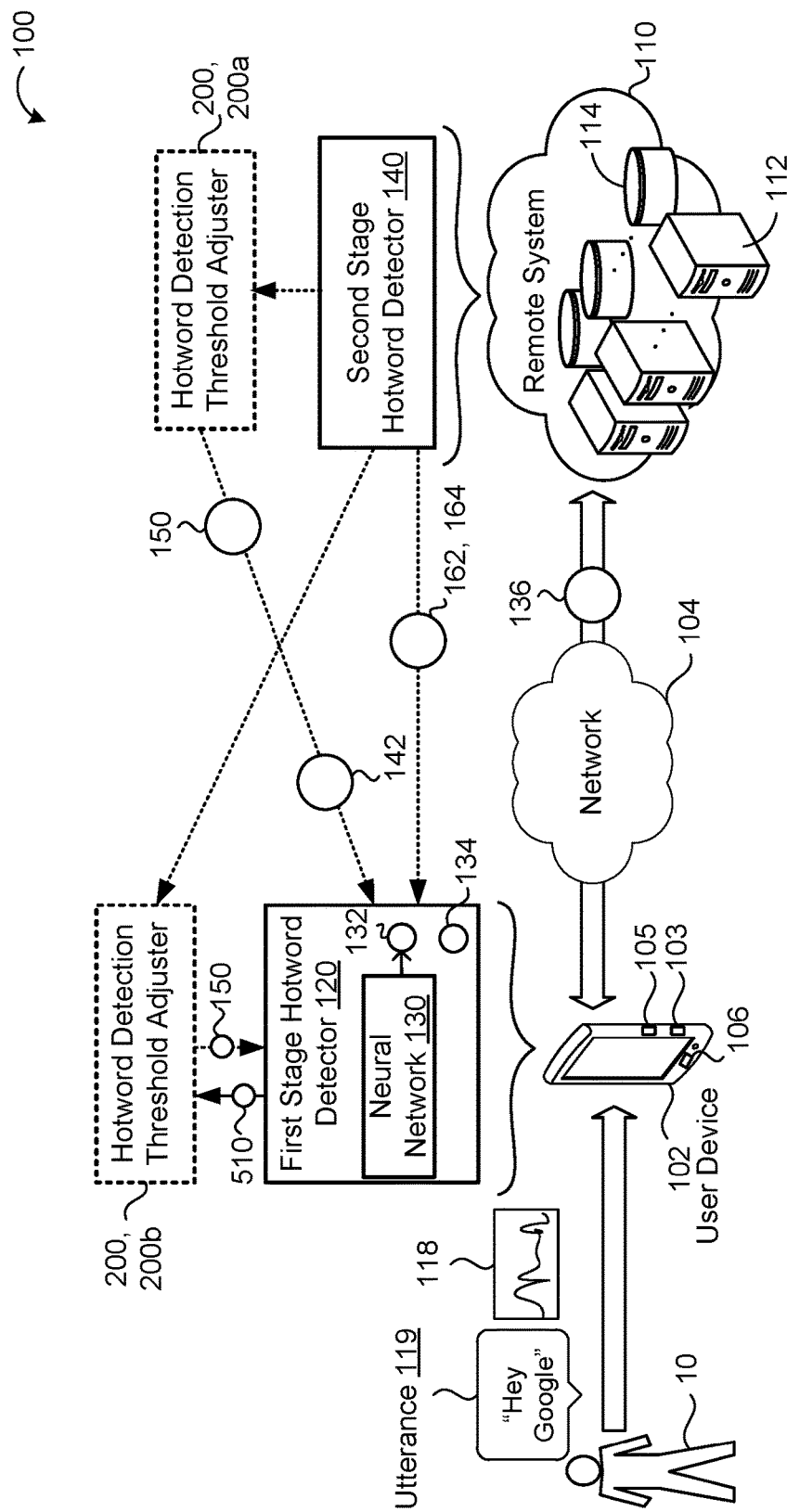
FIG. 1 is a schematic view of an example system that provides automatic hotword threshold tuning.

A voice enabled device (e.g., a user device executing a voice assistant) allows a user to speak a query or a command out loud and field and answer the query and/or perform a function based on the command. Through the use of a "hotword" (also referred to as a "keyword", "attention word", "wake-up phrase/word", "trigger phrase", or "voice action initiation command"), in which by agreement a predetermined term/phrase that is spoken to invoke attention for the voice enabled device is reserved, the voice enabled device is able to discern between utterances directed to the system (i.e., to initiate a wake-up process for processing one or more terms following the hotword in the utterance) and utterances directed to an individual in the environment. Typically, the voice enabled device operates in a sleep state to conserve power and does not process input audio data unless the input audio data follows a spoken hotword. For instance, while in the sleep state, the voice enabled device captures input audio via one or more microphones and uses a hotword detector trained to detect the presence of the hotword in the input audio. When the hotword is detected in the input audio, the voice enabled device initiates a wake-up process for processing the hotword and/or any other terms in the input audio following the hotword.

Hotword detection is analogous to searching for a needle in a haystack because the hotword detector must continuously listen to streaming audio and trigger correctly and instantly when the presence of the hotword is detected in the streaming audio, while ignoring the majority of the streaming audio. Neural networks are commonly employed by hotword detectors to address the complexity of detecting the presence of a hotword in a continuous stream of audio. Typically, the neural networks, based on received streaming audio, generate a probability score that indicates a presence of a hotword in the streaming audio. The hotword detector determines whether the probability score satisfies a detection threshold. When the probability score satisfies the detection threshold, the hotword detector and determines that the hotword is present in the streaming audio. The hotword detector may then initiate a wake-up process of the device.

The hotword detection threshold is conventionally set at a predetermined value that balances false acceptance rates and false rejection rates. A false acceptance occurs when the hotword detector detects a hotword (i.e., the probability score satisfies the hotword detection threshold), however the streaming audio did not actually include the hotword. Despite the false acceptance, the hotword detector will initiate the wake-up process on the voice enabled device even though the user did not intend to invoke the device. On the other hand, a false rejection occurs when the streaming audio includes a hotword, but the hotword detector determines that the hotword is not present in the streaming audio (i.e., the probability score fails to satisfy the hotword detection threshold. A false rejection by the hotword detector is frustrating for the user because the user has to make subsequent attempt to invoke the voice enabled device by speaking the hotword again, usually louder and/or requiring the user to walk closer to the device to ensure that the spoken hotword is not falsely rejected again. Accordingly, selection of a hotword detection threshold is very difficult due to the large variety of devices, environments, and users. Conventionally, the detection threshold is not tailored to each individual device. However, each device may experience drastically different acoustic environments. For example, a device near a television that is often on likely experiences substantially more false acceptances than the same device with the same hotword detection threshold experiences in a quiet office. Additionally, each user may have a considerably different tolerance for false rejections and false acceptances. That is, while one user may tolerate a moderate number of false acceptances, another user may not tolerate the same number of false acceptances.

Implementations herein are directed toward a hotword detection threshold adjuster system that dynamically adjusts the hotword detection threshold of a user device executing a first stage hotword detector to individually tailor the hotword detector to the environment. As used herein, the term "hotword detection threshold" refers to a value or probability score that streaming audio must satisfy in order for the hotword detector to determine/detect that a predetermined hotword was present in audio features of the streaming audio, and thus, trigger a wake-up process on the user device. The first stage hotword detector of the user device detects a hotword in streaming audio based on a first probability score indicating a presence of the hotword in audio features of the streaming audio. Here, the first probability score satisfies the hotword detection threshold associated with the first stage hotword detector to cause the user device to transmit audio data characterizing the hotword detected by the first stage hotword detector to a remote second stage hotword detector for verification. For example, the user device transmits the audio data via the Internet to a server executing the second stage hotword detector. The second stage hotword detector may utilize a hotword detection model that is more accurate for detecting the presence of hotwords in audio compared to a hotword detection model utilized by the first stage hotword detector running on the user device. The second stage hotword detector processes the audio data to determine whether the hotword is detected by the second stage hotword detector. When the hotword is not detected by the second stage hotword detector, the system identifies a false acceptance instance at the first stage hotword indicator that indicates that the first stage hotword detector incorrectly detected the hotword. The system determines whether a false acceptance rate associated with the first stage hotword detector satisfies a false acceptance rate threshold and accordingly adjusts the hotword detection threshold of the first stage hotword detector. For instance, the system may increase the value of the hotword detection threshold in order to decrease the sensitivity of the first stage hotword detector so that occurrences of future false acceptance instances are reduced/eliminated.

Thus, systems described herein include a cascaded hotword detection technique using multiple models to increase accuracy and verify and/or confirm hotword detection. The system determines a rate of false acceptance instances and false rejection instances for each device individually and tailors the hotword detection threshold accordingly based on the respective device's false acceptance rate and false rejection rate.

Referring to FIG. 1, in some implementations, an example system 100 includes one or more user devices 102 each associated with a respective user 10 and in communication with a remote system 110 via a network 104. Each user device 102 may correspond to a computing device, such as a mobile phone, computer, smart speaker, smart appliance, smart headphones, wearable, etc., and is equipped with data processing hardware 103 and memory hardware 105. The user device 102 includes or is in communication with one or more microphones 106 for capturing utterances from the respective user 10. The remote system 110 may be a single computer, multiple computers, or a distributed system (e.g., a cloud environment) having scalable/elastic computing resources 112 (e.g., data processing hardware) and/or storage resources 114 (e.g., memory hardware). In some implementations, the user device 102 receives a trained neural network 130 (e.g., a memorized neural network) from the remote system 110 via the network 104 and executes the trained neural network 130 to detect hotwords in streaming audio 118. The trained neural network 130 resides in a first stage hotword detector 120 (also referred to as a hotworder) of the user device 102 that is configured to detect the presence of a hotword in streaming audio 118 without performing semantic analysis or speech recognition processing on the streaming audio 118.

In the example shown, when the user 10 speaks an utterance 119 including a hotword (e.g., "Hey Google") captured as streaming audio 118 by the user device 102, the first stage hotword detector 120 executing on the user device 102 is configured to detect the presence of the hotword in the utterance 119 to initiate a wake-up process on the user device 102 for processing the hotword and/or one or more other terms (e.g., query or command) following the hotword in the utterance 119. That is, the user device 102 may be configured to initiate the wake-up process to process the hotword and/or one or more other terms following the hotword in the streaming audio 118 when the first stage hotword detector 120 detects the hotword in the streaming audio 118.

The first stage hotword detector 120 generates (e.g., from the neural network 130) a probability score 132 that indicates a presence of the hotword in audio features of the streaming audio 118 captured by the user device 102. The first stage hotword detector 120 detects the hotword in the streaming audio 118 when the probability score 132 satisfies a hotword detection threshold 134 of the first stage hotword detector 120. When the probability score 132 satisfies the hotword detection threshold 134, the first stage hotword detector 120 transmits audio data 136 representative of the streaming audio 118 to a second stage hotword detector 140 executing on the remote system 110. In some examples, the audio data 136 is a direct representation of the streaming audio 118, while in other examples, the audio data 136 represents the streaming audio 118 after processing by the first stage hotword detector 120 (e.g., to identify and/or isolate specific audio characteristics of the streaming audio 118 or to convert the streaming audio 118 to a format suitable for transmission and/or processing by the second stage hotword detector 140). For instance, the audio data 136 may be chomped from the streaming audio 118 to include a relevant segment that includes the audio features associated with the hotword as detected by the first stage hotword detector 120.

The second stage hotword detector 140, like the first stage hotword detector 120, is configured to detect the presence of a hotword in the audio data 136. The second stage hotword detector 140 is different than the first stage hotword detector 120. For example, the second stage hotword detector 140 includes a different neural network that is potentially more computationally-intensive than the neural network 130 of the first stage hotword detector 120. The second stage hotword detector 140 may offer an increased accuracy over the first stage hotword detector 120, which is limited by the resources of the user device 102.

The second stage hotword detector 140 processes the audio data 136 to determine whether the hotword is present in the audio data 136. The second stage hotword detector 140 may generate a probability score to compare against a hotword detection threshold similar to the first stage hotword detector 120 or the second stage hotword detector 140 may determine the presence of the hotword with an entirely different method. When the hotword is not detected by the second stage hotword detector 140 in the audio data 136, a hotword detection threshold adjuster 200, 200a—b (FIG. 2) identifies a false acceptance instance 210 at the first stage hotword detector 120 that indicates that the first stage hotword detector 120 incorrectly detected the hotword in the streaming audio 118.

Figure 2:
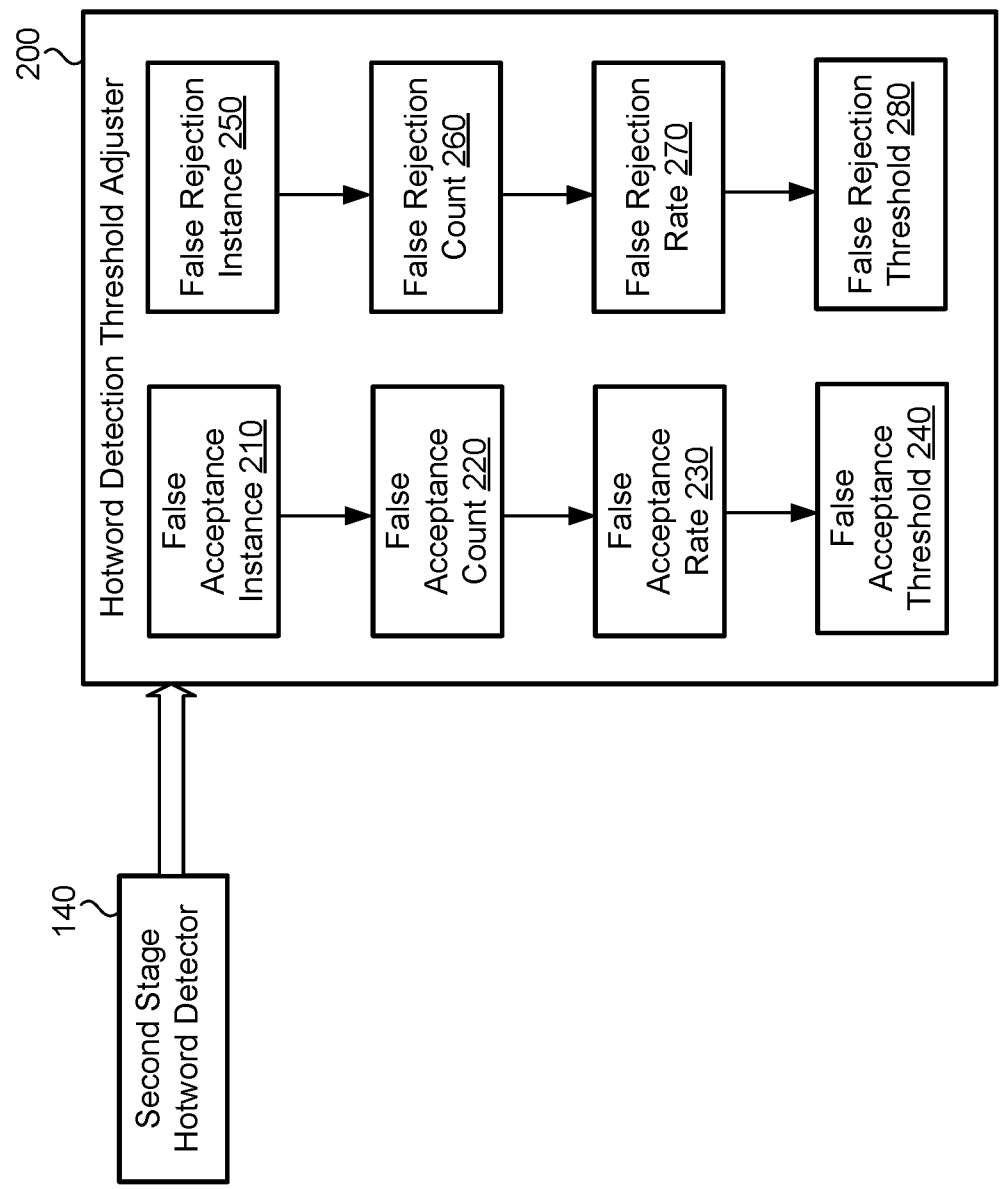
FIG. 2 is a schematic view of exemplary components of a hotword detection threshold adjuster.

Referring now to FIG. 2, the hotword detection threshold adjuster 200 maintains a false acceptance count 220. The hotword detection threshold adjuster 200 increments the false acceptance count 220 in response to identifying the false acceptance instance 210. Based on the false acceptance count 220, the hotword detection threshold adjuster determines a current false acceptance rate 230. The false acceptance rate 230 represents a number of false acceptance instances 210 identified by the hotword detection threshold adjuster 200 within a false acceptance time period. For example, the false acceptance time period may be an hour, or 4 hours, or 24 hours, etc. The false acceptance count 220 may only include the number of false acceptance instances 210 within the most recent false acceptance time period. Thus, the false acceptance rate 230 indicates a frequency at which the first stage hotword detector 120 falsely determines a hotword is present in streaming audio 118.

The hotword detection threshold adjuster 200 may determine whether the false acceptance rate 230 satisfies a false acceptance rate threshold 240. For example, when the false acceptance time period is one hour and the false acceptance rate threshold 240 is three per hour, the false acceptance rate 230 satisfies the false acceptance rate threshold 240 when the hotword detection threshold adjuster 200 identifies three or more false acceptance instances 210 within the most recent hour.

Referring back to FIG. 1, when the false acceptance rate 230 associated with the first stage hotword detector 120 satisfies the false acceptance rate threshold 240, the hotword detection threshold adjuster 200 adjusts the hotword detection threshold 134 of the first stage hotword detector 120. In some implementations, the hotword detection threshold adjuster 200 executes on the remote system 110 (i.e., the hotword detection threshold adjuster 200a) and transmits hotword detection threshold tuning instructions 150 to the first stage hotword detector 120. The tuning instructions 150, when received by the user device 102, cause the user device 102 to adjust the hotword detection threshold 134 of the first stage hotword detector 120. In other implementations, the hotword detection threshold adjuster 200 executes on the user device 102 (i.e., the hotword detection threshold adjuster 200b), and receives an indication 142 of the false acceptance instance 210 from the second stage hotword detector 140 executing on the remote system 110. Here, the user device 102 maintains the false acceptance count 220 and determines the current false acceptance rate 230. The hotword detection threshold adjuster 200b provides the hotword detection threshold tuning instructions 150 to the first stage hotword detector 120 to adjust the hotword detection threshold 134 based on the false acceptance rate threshold 240 and the current false acceptance rate 230.

In some implementations, when the false acceptance rate 230 exceeds the false acceptance rate threshold 240, the hotword detection threshold adjuster 200 increases a value of the hotword detection threshold 134. That is, the probability score 132 required to detect the presence of a hotword in the streaming audio 118 increases, thus making false acceptance instances 210 less likely. The hotword detection threshold adjuster 200, in some examples, adjusts or changes the false acceptance rate threshold 240 based on the adjusted hotword detection threshold 134. In some configurations, the user 10 of the user device 102 may set and/or adjust the false acceptance rate threshold 240.

In some examples, when the hotword is not detected by the second stage hotword detector 140 in the audio data 136, the remote server 110 suppresses a wake-up process on the user device 102. The wake-up process allows the user device 102 to process the hotword and/or one or more other terms following the hotword in the streaming audio 118 (e.g., a query or a command). In some implementations, the remote system 110 suppresses the wake-up process by sending suppression instructions 162 to the user device 102 that causes the user device 102 to suppress the wake-up process. In other implementations, the remote system 110 suppresses the wake-up process by sending an indication 164 to the user device 102 that the second stage hotword detector 140 failed to confirm that the hotword was present in the audio data 136, thereby causing the user device 102 to suppress the wake-up process (i.e., stay or return to the sleep state). In yet other implementations, the remote system 110 suppresses the wake-up process by not responding to the user device 102 (e.g., by closing the network connection) after receiving the audio data 136. A lack of response from the remote system 110 may cause the user device 102 to suppress the wake-up process. That is, the user device 102, in some examples, only initiates the wake-up process upon receiving confirmation from the second stage hotword detector 140 that the hotword was present in the streaming audio 118. The user device 102 may independently suppress the wake-up process. For example, when the query or command following the hotword is empty, the user device 102 may automatically suppress the wake-up process (i.e., the streaming audio 118 following the hotword fails to include a command or query directed at the user device 102). In this instance, the user device 102 may detect the false acceptance instance 210 and inform the hotword detection threshold adjuster to increment the false acceptance count 220.

Figure 3:
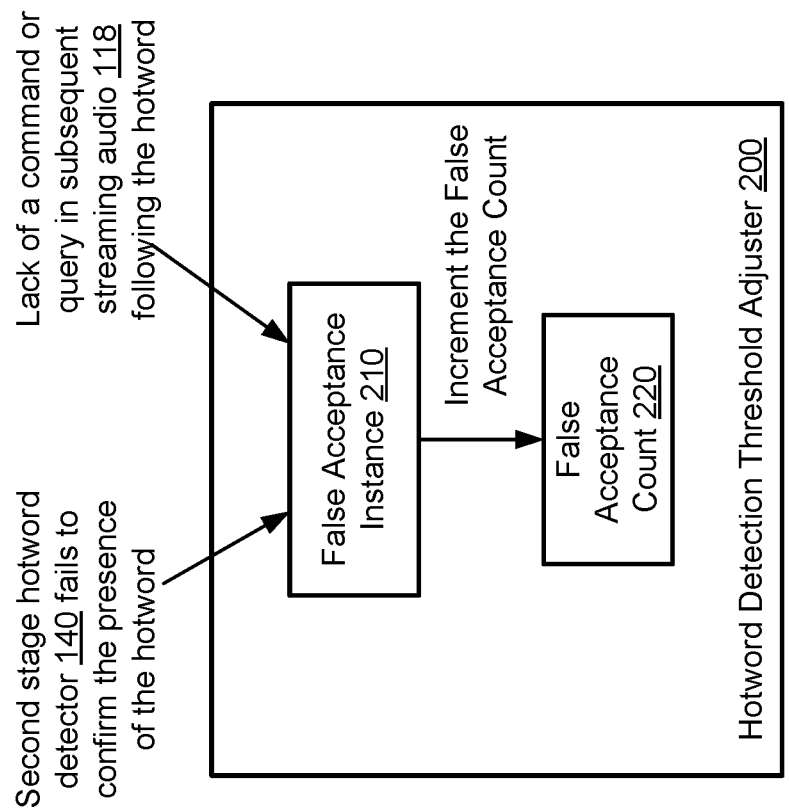
FIG. 3 is a schematic view of the hotword detection threshold adjuster incrementing a false acceptance count.

Referring now to FIG. 3, in some examples, when the hotword is detected by the second stage hotword detector 140 in the audio data 136, the remote system 110 determines whether subsequent audio data 136 characterizing a spoken query following the hotword in the streaming audio 118 is received from the user device 102. When no subsequent audio data 136 characterizing the spoken query is received from the user device 102, the hotword detection threshold adjuster 200 identifies a false acceptance instance 210 at the first stage hotword detector 120 indicating that the first stage hotword detector 120 incorrectly detected the hotword in the streaming audio 118. That is, in some implementations, the hotword detection threshold adjuster 200 identifies a false acceptance instance 210 based on the lack of a query or command in subsequent audio data 136 after the detected hotword. For example, when audio not intended to trigger the wake-up process (e.g., ambient noise in the environment such as from a television) unintentionally or undesirably triggers the hotword detection, the lack of any follow-up query or command (which would occur during an intentional wake-up command) allows the hotword detection threshold adjuster 200 to identify a false acceptance instance 210.

In some examples, when subsequent audio data 136 characterizing the spoken query is received from the user device 102 (i.e., after both the first stage hotword detector 120 and the second stage hotword detector 140 detects the presence of the hotword in the streaming audio 118), the remote system processes the spoken query. In these examples, processing the query may include passing the audio data 136 to a speech recognition system for transcribing the spoken query. The remote system 110 may use the transcription to perform natural language understanding and/or provide the transcription to a search engine and/or other application for processing the query.

In some implementations, the remote system 110 does not include the second stage hotword detector 140 and instead executes a query/command processor 430 (FIG. 4) configured to perform speech recognition on the audio data 136 to confirm if the first stage hotword detector 120 correctly detected the presence of a hotword in the streaming audio 118. That is, in some implementations, the first stage hotword detector 120, after detecting the presence of a hotword in the streaming audio 118, transmits audio data 136 to the remote server to process the subsequent query from the user 10. In this case, the hotword detection threshold adjuster 200 may identify false acceptance instances 210 in scenarios when the processor 430 fails to recognize the hotword in the received audio data 136 as well as when the processor 430 determines that subsequent audio data 136 received from the user device 102 is empty (i.e., instances when the subsequent audio data 136 fails to include a query or command). Here, either case results in the hotword detection threshold adjuster 200 incrementing the false acceptance count 220.

Figure 4:
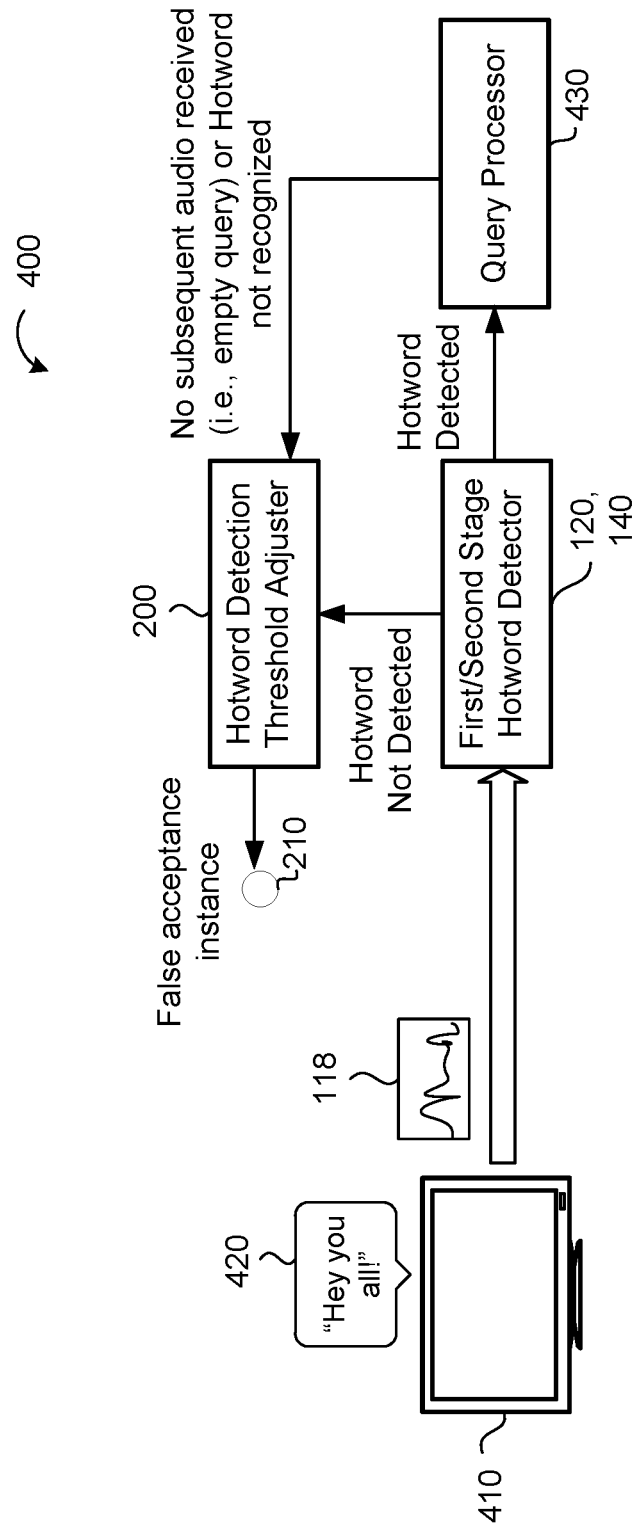
FIG. 4 is a schematic view of an example false acceptance instance.

Referring now to FIG. 4 schematic view 400 depicts a television 410 emitting playback audio 420 that includes the utterance "Hey you all!" Due to the phonetic similarity between the utterance "Hey you all" and the hotword "Hey Google", the first stage hotword detector 120 determines a probability score 132 that satisfies the hotword detection threshold, and thereby detects the presence of the hotword in the streaming audio 118 representative of the playback audio 420a from the television 410. The second stage hotword detector 140 may confirm/verify whether the hotword was correctly detected by the first stage hotword detector 120 as discussed above. The second stage hotword detector 140 may inform the hotword detection threshold adjustor 200 when the second stage hotword detector 140 fails to detect the hotword, thereby resulting in the adjustor 200 identifying a false acceptance instance 210 and incrementing the false acceptance rate 230. On the other hand, the second stage hotword detector 140 may also falsely detect the hotword in the utterance "Hey you all", and pass the corresponding audio to the query processor 430. Here, the query processor 430 may perform speech recognition on the audio data and determine that the hotword was falsely detected by each of the hotword detectors 120, 140. Additionally or alternatively, the processor 430 may determine that no subsequent audio data 136 containing a query or command is received after the hotword was falsely detected. In either of these scenarios, the query processor 430 may inform the hotword detection threshold adjustor 200 to identify a false acceptance instance 210.

Referring back to FIGS. 1 and 2, in some implementations, the hotword detection threshold adjuster 200 identifies a false rejection instance 250 indicative of an instance when the first stage hotword detector 120 failed to detect the presence of a hotword in the streaming audio 118 when the hotword was present. In response, the hotword detection threshold adjuster 200 increments a false rejection count 260 and determines a current false rejection rate 270. When the false rejection rate 270 satisfies a false rejection threshold 280, the hotword detection threshold adjuster 200 adjusts the hotword detection threshold 134. Here, the adjustor 200 provides the hotword detection threshold tuning instructions 150 to the first stage hotword detector 120 to reduce the hotword detection threshold, and thereby increase the sensitivity of the first stage hotword detector 120 for detecting hotwords in streaming audio 118.

The hotword detection threshold adjuster 200 may identify a false rejection instance 250 responsive to receiving a near-miss indication 510 that indicates that the first stage hotword detector 120 detected the hotword in the streaming audio within a threshold period of time after generating a previous probability score that failed to satisfy the hotword detection threshold by a threshold margin. For example, the first stage hotword detector 120 running on the user device 102 may fail to detect the hotword in a first utterance spoken by the user. Here, the first stage hotword detector 120 may determine a probability score equal to 0.7 that fails to satisfy the hotword detection threshold set at 0.75. A near-miss threshold may be set at a value (0.65) less than the hotword detection threshold such that the range of values between the near-miss threshold (0.65) and the hotword detection threshold (0.75) corresponds to the "threshold margin". For instance, the near-miss threshold may be set at 0.65 such that any streaming audio 118 associated with a probability score greater than or equal to the near-miss threshold of 0.65 but less than the hotword detection threshold of 0.75 fails to satisfy the hotword detection threshold by the threshold margin. Continuing with the example, in a subsequent attempt by the user 10 to invoke the user device 102, the first stage hotword detector 120 correctly detects the hotword in a second utterance spoken by the user 10 within the threshold period of time (e.g., 5 seconds). Conditioned by the first stage hotword detector 120 determining the probability score associated with the first utterance failed to satisfy the hotword detection threshold by the threshold margin and subsequently detecting the hotword in the second utterance within the threshold period of time, the hotword detection threshold adjuster 200 may receive the near-miss indication 510 and identify the false rejection instance 250 upon confirmation that the second stage hotword detector 140 also detected the presence of the hotword in the second utterance. Notably, while the more accurate second stage hotword detector 140 may have likely detected the presence of the hotword in the first utterance, the first stage hotword detector 120 never transmitted the corresponding audio data 136 to the second stage hotword detector 140 because first stage hotword detector 120 generated a probability score associated with the first utterance that failed to satisfy the hotword detection threshold. The hotword detection threshold adjuster 200 may determine whether the false rejection rate 270 (based on the false rejection count 260) satisfies the false rejection threshold 280, and when satisfied, adjust the hotword detection threshold 134 of the first stage hotword detector 120. In some examples, the first stage hotword detector 120 provides the near-miss indication 510 to the hotword detection threshold adjustor 200 and the hotword detection threshold adjustor 200 only identifies the false rejection instance 550 upon receiving confirmation that the second stage hotword detector 140 detected the hotword in the audio data 136.

Referring now to FIG. 5A, as an illustration of a near-miss serving as a proxy for a false rejection instance 250, schematic view 500a depicts a user 10 speaking a first utterance 119a ("Hey Google") received at the first stage hotword detector 120 on the user device 102 (not shown). Here, the first stage hotword detector 120 generates a probability score 132 that fails to satisfy the hotword detection threshold 134, but does satisfy a near-miss threshold 520. For example, when the hotword detection threshold 134 is 0.75 and the near-miss threshold 520 is 0.65 (i.e., less than but generally near the hotword detection threshold 134), a probability score of 0.70 (or some other value between 0.65 and 0.75) may fail to satisfy the hotword detection threshold 134 by the threshold margin due to the probability score satisfying the near-miss threshold 520.

Within a threshold period of time (e.g., 5 seconds, 10 seconds, 30 seconds, etc.) after receiving the first utterance 119a, schematic view 500b of FIG. 5B depicts the user 10 issues/speaking a second utterance 119b ("HEY GOOGLE!") in another attempt to invoke the user device to wake-up. This utterance 119b may be spoken more forcibly and/or with more annunciation (as the user device 102 failed to initiate the wake-up process for the previous utterance 119a). In this case, both the first stage hotword detector 120 and the second stage hotword detector 140 determine the presence of the hotword in the streaming audio 118 associated with the second utterance 119b. Despite the first stage hotword detector 120 calculating the probability score 132 for the first utterance 119a that failed to satisfy the hotword detection threshold 134, the hotword detection threshold adjustor 200 receives a near-miss indicator 510 since the probability score 132 for the first utterance satisfied the near-miss threshold 520 and the second utterance 119b was within the threshold period of time to thereby indicate, by way of proxy, that the first stage hotword detector 120 falsely missed a hotword in the streaming audio 118. Once the second stage hotword detector 140 confirms that the hotword is present in the second utterance 119b, the hotword detection threshold adjuster 200 may identify a false rejection instance 250 and increments the false rejection count 260. The hotword detection threshold adjuster 200 may decrease the hotword detection threshold 134 of the first stage hotword detector 120 in response to the false rejection rate 270 satisfying the false rejection threshold 280.

In some examples, hotword detection threshold adjuster 200 may adjust the hotword detection threshold 134 of the first stage hotword detector 120 based on a combined value that is representative of hotword usage, false acceptance counts 220, and false rejection counts 260, by applying a predefined threshold to the combined value. For example, the combined value is the ratio of false acceptances to false rejections (i.e., because the false acceptance count 220 and the false rejection count 260 are generally inversely related). In other examples, the hotword detection threshold adjuster 200 adjusts the hotword detection threshold 134 of the first stage hotword detector 120 based on information gathered from other user devices 102 executing a first stage hotword detector 120. In these examples, the remote system 110 estimates the multivariate distribution of hotword usage, false acceptance counts 220 (or false acceptance rate 230), and false rejection counts 260 (or false acceptance rate 270) from a large population of user device 102 and identifies outliers in the distribution to trigger threshold tuning by the hotword detection threshold adjuster 200 of the outliers. That is, devices that have false acceptance counts 220 or false rejection counts 260 that sufficiently deviate from the general population may be candidates for threshold tuning.

Figure 6:
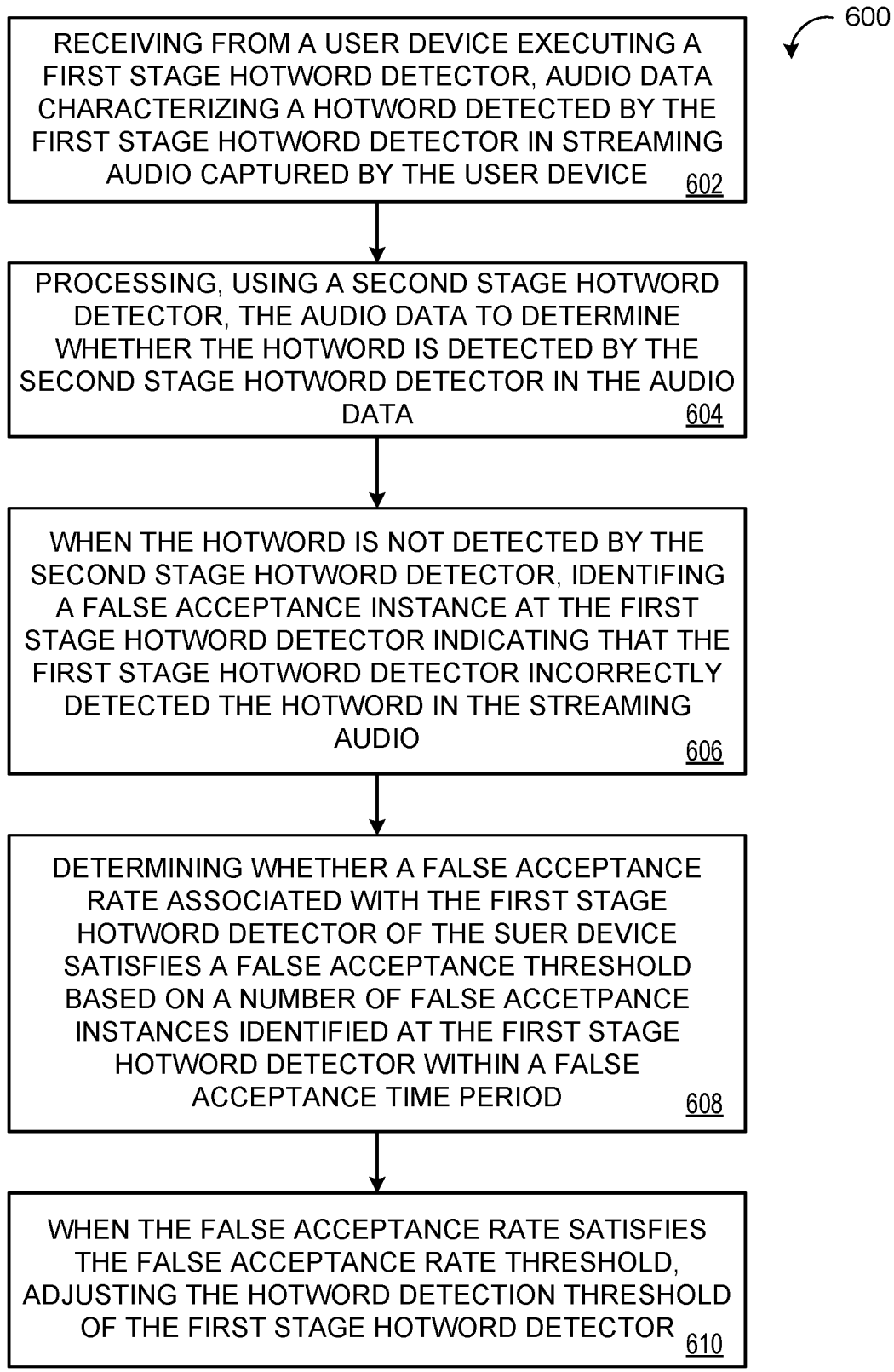
FIG. 6 is a flowchart of an example arrangement of operations for a method of providing automatic hotword threshold tuning.

FIG. 6 is a flowchart of an exemplary arrangement of operations for a method 600 for automatic hotword threshold tuning. The method 600 includes, at operation 602, receiving, at data processing hardware 112, from a user device 102 executing a first stage hotword detector 120, audio data 136 characterizing a hotword detected by the first stage hotword detector 120 in streaming audio 118 captured by the user device 102. The first stage hotword detector 120 is configured to generate a probability score 132 indicating a presence of the hotword in audio features of the streaming audio 118 captured by the user device 102 and detect the hotword in the streaming audio 118 when the probability score 132 satisfies a hotword detection threshold 134 of the first stage hotword detector 120.

At operation 604, the method 600 includes processing, by the data processing hardware 112, using a second stage hotword detector 140, the audio data 136 to determine whether the hotword is detected by the second stage hotword detector 140 in the audio data 136. When the hotword is not detected by the second stage hotword detector 140 in the audio data 136, the method 600 includes, at operation 606, identifying, by the data processing hardware 112, a false acceptance instance 210 at the first stage hotword detector 120 indicating that the first stage hotword detector 120 incorrectly detected the hotword in the streaming audio 118.

The method 600, at operation 608, includes determining, by the data processing hardware 112, whether a false acceptance rate 230 associated with the first stage hotword detector 120 of the user device 102 satisfies a false acceptance rate threshold 240. The false acceptance rate 230 is based on a number of false acceptance instances 210 identified at the first stage hotword detector 120 within a false acceptance time period. When the false acceptance rate 230 associated with the first stage hotword detector 120 satisfies the false acceptance rate threshold 240, the method 600, at operation 610, adjusting, by the data processing hardware 112, the hotword detection threshold 134 of the first stage hotword detector 120.

Figure 7:
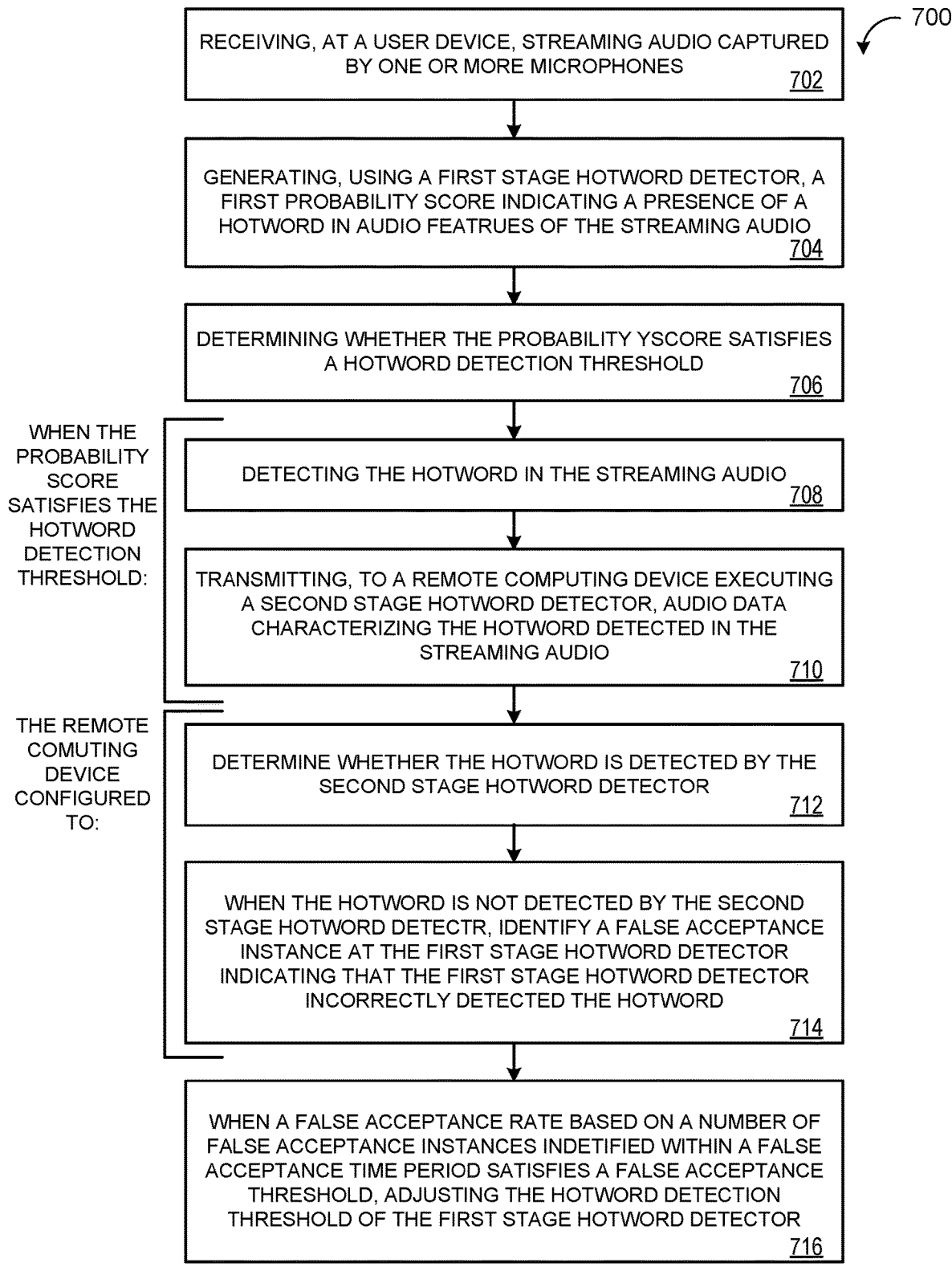
FIG. 7 is a flowchart of another example arrangement of operations for a method of providing automatic threshold tuning.

FIG. 7 is a flowchart of another exemplary arrangement of operations for a method 700 for automatic hotword threshold tuning. The method 700 includes, at operation 702, receiving, at data processing hardware 103 of a user device 102, streaming audio 118 captured by one or more microphones 106 in communication with the data processing hardware 103. The method 700, at operation 704, includes generating, by the data processing hardware 103, using a first stage hotword detector 120, a probability score 132 indicating a presence of a hotword in audio features of the streaming audio 118.

At operation 706, the method 700 includes determining, by the data processing hardware 103, whether the probability score 132 satisfies a hotword detection threshold 134. When the probability score 132 satisfies the hotword detection threshold 134, the method 700 includes, at operation 708, detecting, by the data processing hardware 103, the hotword in the streaming audio 118, and, at operation 710, transmitting, by the data processing hardware 103, to a remote computing device 110 executing a second stage hotword detector 140, audio data 136 characterizing the hotword detected in the streaming audio 118 using the first stage hotword detector 120.

The remote computing device 110 is configured to, at operation 712, determine whether the hotword is detected by the second stage hotword detector 140 in the audio data 136. The remote computing device is configured to, at operation 714, when the hotword is not detected by the second stage hotword detector 140 in the audio data 136, identify a false acceptance instance 210 at the first stage hotword detector 120 indicating that the first stage hotword detector 120 incorrectly detected the hotword in the streaming audio 118. When a false acceptance rate 230 based on a number of false acceptance instances 210 identified at the first stage hotword detector 120 within a false acceptance time period satisfies a false acceptance rate threshold 240, the method 700 includes, at operation 716, adjusting, by the data processing hardware 103, the hotword detection threshold 134 of the first stage hotword detector 120.

Figure 8:
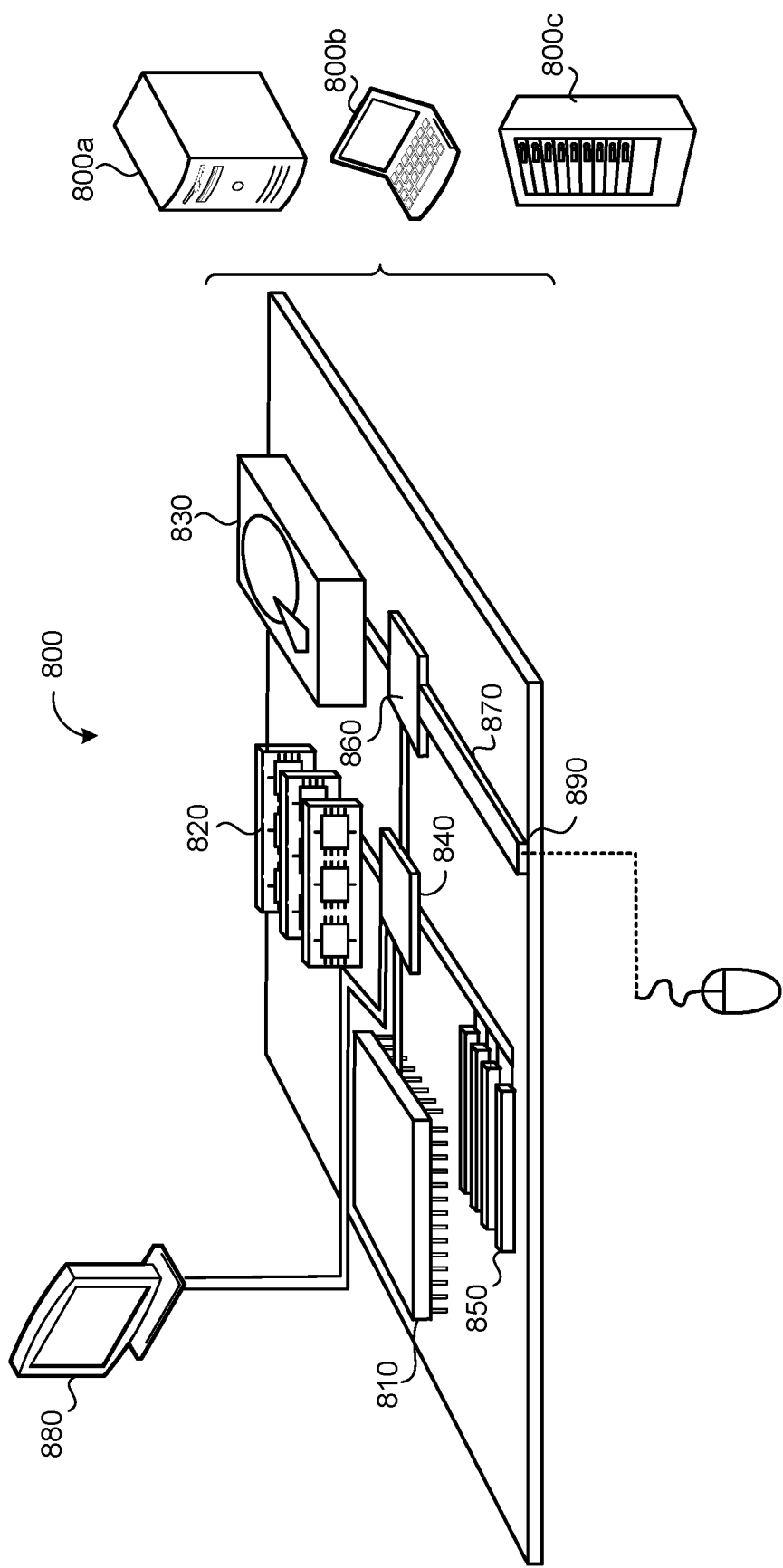
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:
   receiving a near-miss indication and audio data characterizing a hotword detected by a hotword detector in streaming audio captured by a user device, the near-miss indication indicating that the hotword detector detected the hotword in the streaming audio within a threshold period of time after generating a previous probability score that failed to satisfy a hotword detection threshold of the hotword detector, wherein the hotword detector is configured to:
      generate a probability score indicating a presence of the hotword in audio features of the streaming audio captured by the user device; and
      detect the hotword in the streaming audio when the probability score satisfies a hotword detection threshold, wherein the previous probability score indicates the presence of the hotword in previous audio features of the streaming audio captured by the user device;

identifying a false rejection instance at the hotword detector indicating that the hotword detector failed to detect the hotword in the previous audio features of the streaming audio; and
determining whether a false rejection rate associated with the hotword detector satisfies a false rejection rate threshold;
processing the audio data to confirm that the hotword was correctly detected by the hotword detector in the streaming audio; and
based on the near-miss indication, the confirmation that the hotword was correctly detected by the hotword detector in the streaming audio, and determining the false rejection rate associated with the hotword detector satisfies the false rejection rate threshold, adjusting the hotword detection threshold of the hotword detector.

2. The computer-implemented method of claim 1, wherein adjusting the hotword detection threshold of the hotword detector comprises decreasing the hotword detection threshold of the hotword detector.

3. The computer-implemented method of claim 1, wherein processing the audio data comprises performing speech recognition on the audio data to confirm that that the hotword was correctly detected by the hotword detector in the streaming audio when the hotword is recognized in the audio data.

4. The computer-implemented method of claim 1, wherein processing the audio data comprises processing the audio data without performing semantic analysis or speech recognition processing on the audio data to confirm that the hotword was correctly detected by the hotword detector in the streaming audio.

5. The computer-implemented method of claim 1, wherein the false rejection rate is based on a number of false rejection instances identified at the hotword detector within a false rejection time period.

6. The computer-implemented method of claim 1, wherein the hotword detector executes on the user device.

7. The computer-implemented method of claim 1, wherein the hotword detector comprises a neural network trained to detect the presence of the hotword in the streaming audio without performing semantic analysis or speech recognition processing on the streaming audio.

8. A system comprising:
data processing hardware; and
memory hardware in communication with the data processing hardware, the memory hardware storing instructions that when executed on the data processing hardware cause the data processing hardware to perform operations comprising:
receiving a near-miss indication and audio data characterizing a hotword detected by a hotword detector in streaming audio captured by a user device, the near-miss indication indicating that the hotword detector detected the hotword in the streaming audio within a threshold period of time after generating a previous probability score that failed to satisfy a hotword detection threshold of the hotword detector, wherein the hotword detector is configured to:
generate a probability score indicating a presence of the hotword in audio features of the streaming audio captured by the user device; and
detect the hotword in the streaming audio when the probability score satisfies a hotword detection threshold, wherein the previous probability score indicates the presence of the hotword in previous audio features of the streaming audio captured by the user device;
identifying a false rejection instance at the hotword detector indicating that the hotword detector failed to detect the hotword in the previous audio features of the streaming audio; and
determining whether a false rejection rate associated with the hotword detector satisfies a false rejection rate threshold;
processing the audio data to confirm that the hotword was correctly detected by the hotword detector in the streaming audio; and
based on the near-miss indication, the confirmation that the hotword was correctly detected by the hotword detector in the streaming audio, and determining the false rejection rate associated with the hotword detector satisfies the false rejection rate threshold, adjusting the hotword detection threshold of the hotword detector.

9. The system of claim 8, wherein adjusting the hotword detection threshold of the hotword detector comprises decreasing the hotword detection threshold of the hotword detector.

10. The system of claim 8, wherein processing the audio data comprises performing speech recognition on the audio data to confirm that that the hotword was correctly detected by the hotword detector in the streaming audio when the hotword is recognized in the audio data.

11. The system of claim 8, wherein processing the audio data comprises processing the audio data without performing semantic analysis or speech recognition processing on the audio data to confirm that the hotword was correctly detected by the hotword detector in the streaming audio.

12. The system of claim 8, wherein the false rejection rate is based on a number of false rejection instances identified at the hotword detector within a false rejection time period.

13. The system of claim 8, wherein the hotword detector executes on the user device.

14. The system of claim 8, wherein the hotword detector comprises a neural network trained to detect the presence of the hotword in the streaming audio without performing semantic analysis or speech recognition processing on the streaming audio.

* * * * *